March 1, 1960 L. C. ZONKER ET AL 2,926,682
LIQUID PETROLEUM GAS REGULATOR AND RELIEF VALVE THEREFOR
Filed July 1, 1957

Lawrence C. Zonker,
Paul Polamero
INVENTORS.

BY
Attorney

United States Patent Office 2,926,682
Patented Mar. 1, 1960

2,926,682

LIQUID PETROLEUM GAS REGULATOR AND RELIEF VALVE THEREFOR

Lawrence C. Zonker, Los Angeles, and Paul Polamero, Glendale, Calif.

Application July 1, 1957, Serial No. 669,173

4 Claims. (Cl. 137—62)

Our invention relates to liquid petroleum gas regulators of the general type shown in U.S. Patent No. 2,775,981 issued January 1, 1957, to Lawrence C. Zonker. In regulators of this type, the butane, or other liquid petroleum, is supplied to a primary expansion chamber in the regulator from a storage tank for the butane, where it expands into a gas at a pressure below that of the butane in the storage tank. From this chamber the gas passes through a low-pressure port into a secondary expansion chamber from which it is drawn by a venturi into a carburetor where it is mixed with air for operation of an internal-combustion engine. Through a passage interposed between the two chambers, heated water from the cooling system of the engine is continuously circulated for the purpose of vaporizing and heating the low-pressure gas in both of the chambers to render it suitable for efficient operation of the engine.

If, for any reason, circulation of the heated water through the passage temporarily or permanently fails while the engine is in operation, expansion of the gas in the two chambers produces a refrigerating effect which causes the water in the passage to freeze. The increased volume and resultant increased pressure of the water by reason of such freezing acts to distort or burst the regulator casing, thus rendering the regulator unfit for further use. To relieve the passage of this increased water volume and pressure and thus prevent damage to the regulator, relief valves such as "Welch" plugs have been employed. These plugs or other type of valves are blown out of the regulator casing when the water freezes, and, therefore, require either repair or replacement.

It is a purpose of our invention to provide a relief valve which does not require replacement, will not deteriorate, and can be used indefinitely without repair.

It is also a purpose of our invention to provide a regulator designed specifically to accommodate the relief valve interiorly thereof and in such manner that the valve will, at all times, function as intended to relieve the water passage of the increased volume and pressure of the water as a result of the freezing thereof.

We will describe only one form of liquid petroleum gas regulator and relief valve, each embodying our invention and will then point out the novel features thereof in claims.

Figure 1:
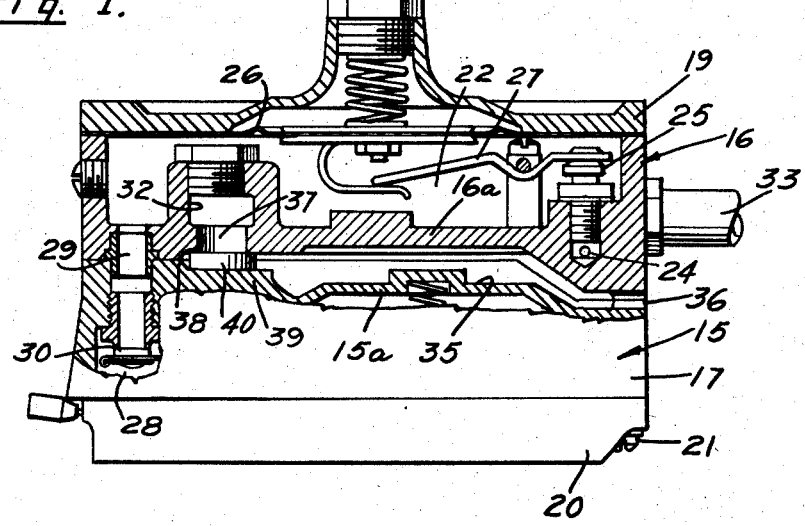
Fig. 1 is a view showing in elevation and partly in section one form of regulator and relief valve embodying our invention, the valve being shown in closed position.

Referring more particularly to the drawings, the regulator of our invention comprises a cast metal casing, indicated generally at 15, which is made in two sections 16 and 17, secured one to the other by bolts 18, and cover plates 19 and 20 for the outer sides of the sections removably secured thereto by suitable fastening members 21.

Between the cover 19 and the section 16 a primary gas expansion chamber 22 is formed to which butane, or other liquid petroleum, is supplied from a suitable source (not shown) through a pipe 23 and a passage 24 controlled by a primary inlet valve 25 operable by a diaphragm 26 through a lever 27.

Between the top wall 15a of the casing section 15 and the cover plate 20 is formed a secondary gas expansion chamber 28 which communicates with the primary chamber 22 through a passage 29 controlled by a secondary valve 30. The chamber 28 communicates with a gas outlet pipe 31 that is adapted to be connected to the intake manifold of an engine.

Figure 3:
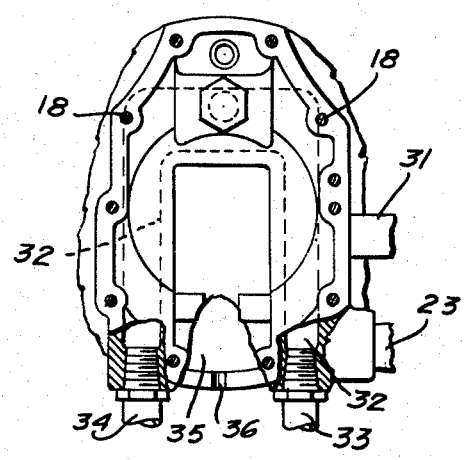
Fig. 3 is a sectional view taken substantially on the line 3—3 of Fig. 2.
Figure 4:
Fig. 4 is an enlarged detail perspective view of the relief valve.

The casing section 16 is interiorly constructed to form a U-shaped passage 32, shown in broken lines in Fig. 3, and the ends of this passage communicate with pipes 33 and 34 which are adapted for circuit communication with the water-cooling system of an internal combustion engine so that the heated water therein will be continuously circulated through the passage when the engine is operating.

The confronting walls 15a and 16a of the two casing sections 15 and 16 are so shaped as to provide therebetween an escape chamber or passage 35, one end of which is always in communication with atmosphere through an escape orifice 36 formed by recessing the walls at opposed points. The other end of the chamber 35 communicates with the passage 32 through a port 37 so formed in the wall 16a as to provide a seat 38 at one end thereof which is spaced from a flat portion 39 formed on the wall 15a directly opposite the seat.

A relief valve 40 is interposed between the seat 38 and the portion 39 to control the passage of water from the passage 32 into the escape chamber 35. This valve is preferably of disk form and is made of resilient and displaceable rubber, or neoprene, or any other material possessing these characteristics, to insure expansion to its normal shape following compression or displacement thereof. Also, the valve material should be resistant, without deterioration, to both high and low temperatures or to oil, gas or antifreeze compounds.

The diameter of the valve 40 is such that it overlaps the seat 38 at its edge, and its normal thickness is such as to seal the port 37 (see Fig. 1) against the escape of water into the chamber 35 under the water pressures existing in the passage 32 during normal operation of the cooling system of the engine and the regulator.

It will be understood that the valve 40 is placed on the portion 39 before the sections 16 and 17 are assembled, and thus when assembled the valve is held against the seat 38 so as to normally close the port 37.

In the operation of the regulator as connected to the source of liquid butane, to the engine, and its water-cooling system as previously described herein, the liquid butane passes into the primary expansion chamber 22 under operation of the engine and under control of the inlet valve 25 as adjusted by the diaphragm 26 in accordance with the pressure in the chamber 22. Upon entering the chamber 22 the butane expands into a gas at a suitable low pressure where it is exposed to the heat of the water in the passage 32. This gas is thereby vaporized and converted into a dry gas which flows through the passage 29, past the normally open valve 30, and into the secondary chamber 28 where it is further heated by the water in the passage 32, and thus further vaporized before it finally passes out of the pipe 31 to the intake manifold for operation of the engine.

As will be understood the expansion of gas in the chambers 22 and 28 produces, through heat absorption, a refrigerating effect within the regulator which tends to freeze the water in the passage 32. Therefore, to so counteract this refrigerating effect as to prevent the water freezing in the passage and consequent bursting or otherwise damaging the regulator and thus rendering it unfit for further use, it is necessary that the water be kept constantly in circulation through the passage. Temporary or complete lack of water circulation, such as by failure of the water pump, and continued operation of the engine, which means that fuel continues to pass into and expand in the chambers 22 and 28, would permit freezing of the water in the passage 32 with the detrimental effects above stated.

Figure 2:
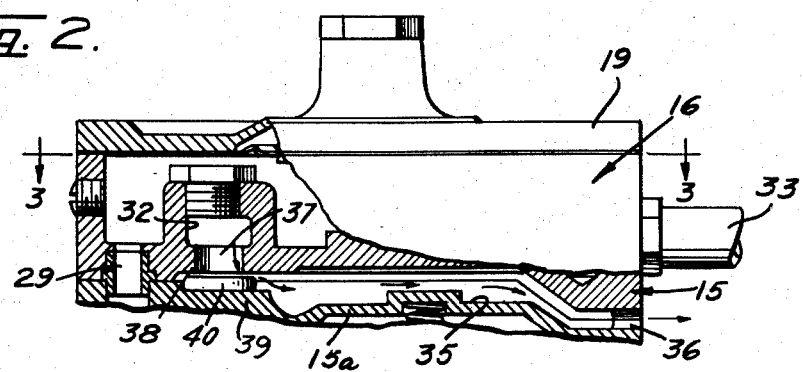
Fig. 2 is a view similar to Fig. 1 showing the valve in open position.

Should this occur in the present regulator, the relief valve 40 will be actuated to open the port 37 thus relieving the passage of the increased volume and pressure resultant of the water freezing therein, to atmosphere through the escape chamber 35 and the orifice 36. The increased water volume and pressure as exerted on the valve 40 causes it to be compressed or displaced to the reduced thickness as shown in Fig. 2, whereby it is caused to move away from the seat 38 thus placing the passage 32 in communication with the escape chamber 35.

Once circulation of water through the passage 32 is restored, the valve 40 will expand to its normal form thus closing the port 37 to prevent escape of water from the passage 32 so that the regulator will again operate as intended. Manifestly, such a relief valve can be used indefinitely to open and close the port 37 with each failure and restoration of water circulation through the passage 32, and, therefore, it can be used indefinitely without repair or the necessity of replacement.

Although we have herein shown and described only one form of liquid petroleum gas regulator and relief valve, each embodying our invention, it is to be understood that various changes and modifications may be made therein without departing from the spirit of the invention and the spirit and scope of the appended claims.

What we claim is:

1. In combination: a liquid petroleum gas regulator having a first chamber in which liquid fuel is adapted to expand into a gas, a passage through which water is adapted to be circulated for vaporizing the gas in the first chamber, an escape chamber having an outlet orifice leading to atmosphere, a port providing communication between the escape chamber and the passage, the port provided at that end facing the escape chamber with a seat; a member formed on one wall of the escape chamber opposite the seat; and a valve between the seat and the member, the valve being made of a resilient and displaceable material such that the valve engages the seat and thus closes the port for maintaining the passage out of communication with the escape chamber when the water in the passage is above a freezing temperature, and displaceable to cause the valve to disengage the seat and thus open the port in response to the increased volume and pressure of the water in the passage when frozen, thereby placing the passage in communication with the escape chamber.

2. The combination as embodied in claim 1, wherein the port is of circular form, the member is substantially flat and the valve is flat.

3. A liquid petroleum gas regulator including: a casing having first and second sections detachably secured to each other at their confronting sides; a first chamber formed in the first section in which liquid fuel is adapted to expand into a gas; a passage in the first section through which water is adapted to be circulated for vaporizing the gas in said chamber; an outlet port in said passage; the confronting sides of said sections constructed to provide an escape chamber one end of which communicates with said port and the other end of which leads to atmosphere; one wall of the escape chamber at a point opposite said port formed with a member, and said port formed with a seat facing the member; and a valve which, before said sections are assembled, is placed on said member so as to be disposed between the latter and the seat when said sections are assembled, the valve being made of a resilient and displaceable material such that the valve engages the seat and thus closes the port for maintaining the passage out of communication with the escape chamber when the water in the passage is above a freezing temperature, and displaceable to cause the valve to disengage the seat and thus open the port in response to the increased volume and pressure of the water in the passage when frozen, thereby placing the passage in communication with the escape chamber.

4. A liquid petroleum gas regulator as embodied in claim 3 wherein the confronting sides of the member and seat are flat, and the valve is in the form of a disk of a diameter exceeding that of the seat.

References Cited in the file of this patent

UNITED STATES PATENTS 2,744,387    Reed et al. _____ May 8, 1956

FOREIGN PATENTS 628,733    France _____ Jan. 12, 1927